United States Patent [19]

Sougen

[11] Patent Number: 4,577,239
[45] Date of Patent: Mar. 18, 1986

[54] VIDEO TAPE RECORDER USABLE WITH DIFFERENT TYPES OF TAPE CASSETTES

[75] Inventor: Katsuya Sougen, Tokyo, Japan

[73] Assignee: AIWA Co., Ltd., Tokyo, Japan

[21] Appl. No.: 320,572

[22] Filed: Nov. 12, 1981

[30] Foreign Application Priority Data

Nov. 12, 1980 [JP] Japan ................. 55-158189

[51] Int. Cl.⁴ .............. G11B 5/86; G11B 15/46; H04N 5/78
[52] U.S. Cl. .................. 360/15; 360/33.1; 360/61; 360/73
[58] Field of Search ........... 360/8.4, 71, 84, 13, 360/94, 85, 92, 15, 73, 33.1, 61, 121; 369/10, 84, 14, 85, 15, 76

[56] References Cited

U.S. PATENT DOCUMENTS

| | | | |
|---|---|---|---|
| 3,295,853 | 1/1967 | Cheng | 360/15 |
| 3,410,470 | 11/1968 | Metzner | 360/92 |
| 3,560,666 | 2/1971 | Bookman | 360/92 |
| 3,911,488 | 10/1975 | Wood et al. | 360/71 |
| 4,108,365 | 8/1978 | Hughes | 360/15 |
| 4,121,262 | 10/1978 | Ushio et al. | 360/13 |
| 4,122,500 | 10/1978 | Bradford et al. | 360/13 |
| 4,309,729 | 1/1982 | Kice | 360/92 |
| 4,357,636 | 11/1982 | Taketomi et al. | 360/13 |

FOREIGN PATENT DOCUMENTS

| | | | |
|---|---|---|---|
| 54-125019 | 9/1979 | Japan | 360/92 |
| 55-97008 | 7/1980 | Japan | 360/121 |

Primary Examiner—Donald McElheny, Jr.
Assistant Examiner—Steven R. Garland
Attorney, Agent, or Firm—Murray, Whisenhunt and Ferguson

[57] ABSTRACT

A video tape recorder which is capable of reproducing video signals from either of the VHS system and β system tape cassettes. The video signal recorded on a magnetic tape of either one of the VHS system or β system tape cassettes can be recorded on the magnetic tape of the other type tape cassette and reproduced therefrom.

1 Claim, 9 Drawing Figures

VIDEO TAPE RECORDER USABLE WITH DIFFERENT TYPES OF TAPE CASSETTES

BACKGROUND OF THE INVENTION

1. Field of the Invention

The present invention relates to a video tape recorder which is usable with different types of cassettes, each having loaded therein a magnetic tape.

2. Description of the Prior Art

Heretofore, there have been proposed a variety of video tape recorders (hereinafter referred simply as VTR) for use with a cassette (hereinafter referred to simply as a tape cassette) having loaded therein a magnetic tape. The most common traditional types of VTR's are one of the type employing a VHS system developed by a Nihon Victor Corporation group and one of the type employing a $\beta$ MAX system (hereinafter referred simply as $\beta$ system) developed by a Sony Corporation Group.

There is a difference between these two types of VTR's in that tape cassettes for use therewith differ in construction and in size. On account of this, a tape cassette for the VHS system (hereinafter referred to as a VHS system tape cassette) and a tape cassette for the $\beta$ system (hereinafter referred to as a $\beta$ system tape cassette) cannot be used with the VTR of the $\beta$ system (hereinafter referred to as the $\beta$ system VTR) and the VTR of the VHS system (hereinafter referred to as a VHS system VTR), respectively.

Accordingly, in order to use the two types' of tape cassettes, it is necessary to prepare both of the VHS system and the $\beta$ system VTR's. Also in the case of the recording video signals produced from the tape of either one of the VHS system and the $\beta$ system tape cassette onto the tape of the other tape cassette, both of the VHS system and the $\beta$ system VTR's must be prepared. This means the necessity of expenditure and space about twice as much as those needed for one VTR. The same is true of other types of tape cassettes which differ in structure and size from the VHS system and the $\beta$ system tape cassettes.

SUMMARY OF THE INVENTION

It is therefore an object of the present invention to provide a novel VTR which can be used with tape cassettes of different constructions and sizes.

Another object of the present invention is to provide a novel VTR with which it is possible that video signals reproduced from the tape of either one of two different types of first and second tape cassettes used are recorded on the tape of the other tape cassette.

In accordance with an aspect of the present invention, video signals recorded on the tapes of first and second tape cassettes can equally be reproduced.

In accordance with another aspect of the present invention, external video signals can equally be recorded on and reproduced from the tapes of both of the first and second tape cassettes.

In accordance with another aspect of the present invention, video signals reproduced from the tape of either one of the first and second tape cassettes can be recorded on the tape of the other tape cassette.

In accordance with another aspect of the present invention, video signals recorded on the tapes of the VHS system and BETA system tape cassettes can equally be reproduced. In this case, the VTR of the present invention is provided with VHS system and $\beta$ system tape cassette loading units respectively similar to those employed in the VHS system and $\beta$ system VTR's.

Further, rotary magnetic heads are individually provided for the VHS system and $\beta$ system tapes, which are similar to those utilized in the VHS system and $\beta$ system VTR's, respectively. The rotary magnetic heads are independently driven by different rotary head drive units for the VHS system and $\beta$ system tapes, which are similar to those used in the VHS system and the $\beta$ system VTR's, respectively. In the VTR of the present invention, however, the both rotary head drive units are placed under the control of a common servo system for controlling their drive. Accordingly, the VTR of the present invention is simple-structured as a whole and is capable of equally reproducing video signals recorded on the tapes of the VHS system and $\beta$ system tape cassettes.

In accordance with another aspect of the present invention, external video signals can be recorded on and reproduced from the tapes of both of the VHS system and $\beta$ system tape cassettes. In this case, the VTR of the present invention is similarly provided with VHS system and $\beta$ system tape cassette loading units and rotary head drive units for the VHS system and $\beta$ system tapes. In the VTR of the present invention, however, the both rotary head drive units are controlled by a common servo system for controlling their drive. Accordingly, the VTR of the present invention is simple in construction as a whole and permits recording of external video signals on the tapes of the VHS system and $\beta$ system tape cassettes and reproducing therefrom of the recorded signals.

In accordance with the yet another aspect of the present invention, video signals reproduced from the tape of either one of the VHS system and $\beta$ system tape cassettes can be recorded on the tape of the other tape cassette. Also in this case, the VTR of the present invention is likewise equipped with VHS system and $\beta$ system tape cassette loading units and rotary heads drive units for the VHS system and $\beta$ system tapes. In the VTR of the present invention, however, the both rotary head drive units are placed under the control of a common servo system. Accordingly, the VTR of the present invention is simple-structured as a whole and permits recording of video signals reproduced from the tape of either one of the VHS system and the $\beta$ system tape cassettes onto the tape of the other tape cassette.

Other objects, features and advantages of the present invention will become more fully apparent from the following description taken in conjunction with the accompanying drawings.

DESCRIPTION OF THE PREFERRED EMBODIMENTS

Figure 1:
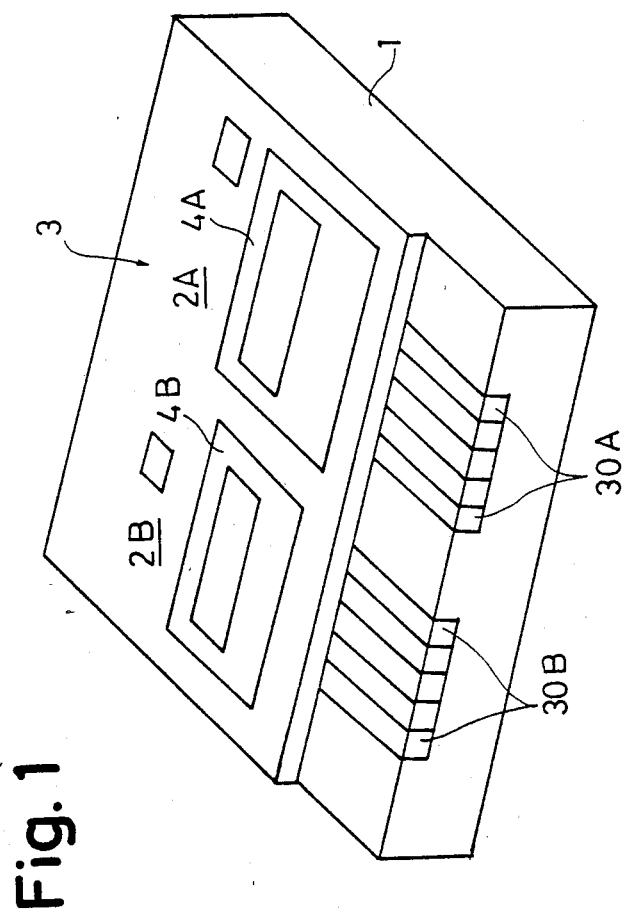
FIG. 1 is a perspective view schematically showing embodiments of the VTR of the present invention.
Figure 2:
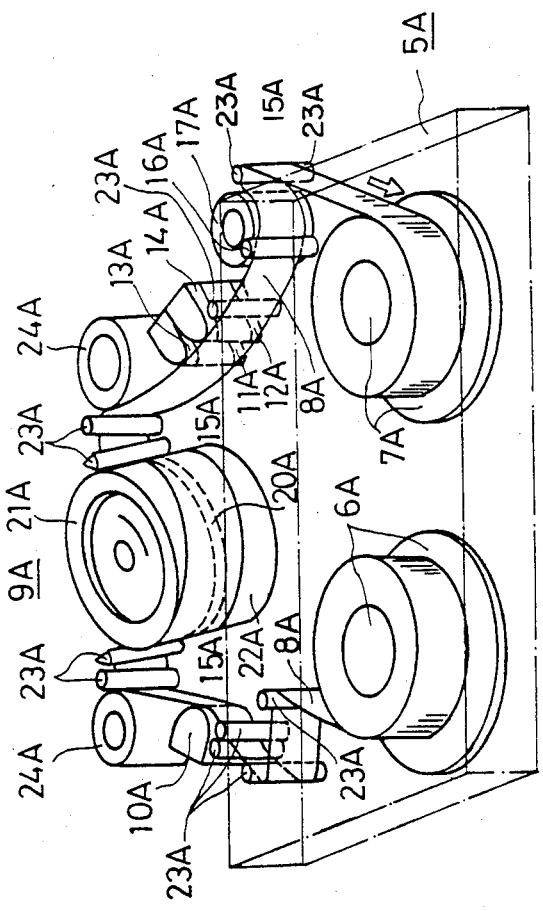
FIGS. 2 and 3 are perspective views schematically showing specific examples of mechanisms for driving a magnetic tape which are employed in the embodiments of FIG. 1.
Figure 3:
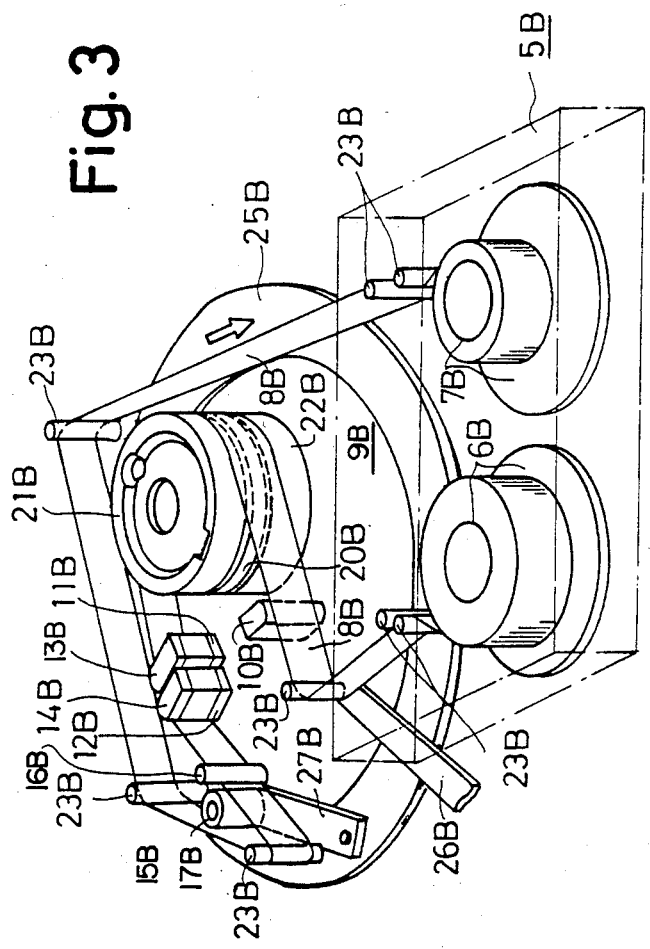

FIG. 1 schematically illustrates an embodiment of the VTR of the present invention which can be used with either of the VHS system and β system tape cassettes. In FIG. 1, reference numeral 1 indicates generally a case, which is provided with a VHS system and β system tape cassette loading units 2A and 2B. Since the cassette loading unit 2A is similar in construction with that employed in known VHS system VTR's, no detailed description will be given. The cassette loading unit 2A has a VHS system tape cassette loading member 4A which is movable in a direction perpendicular to the top surface 3 of the case 1. By the use of the cassette loading member 4A, a known VHS system tape cassette 5A shown in FIG. 2 is brought from the outside to an upper position in the case 1 and brought out therefrom. The cassette loading unit 2B is similar in construction with that utilized in known β system VTR's, and hence will not be described in detail. The cassette loading unit 2B has a β system tape cassette loading member 4B which is also movable in the direction perpendicular to the top surface 3 of the case 1. By the cassette loading member 4B a known β system tape cassette 5B depicted in FIG. 3 is brought into and out of the case 1. The cassette 5A has a supply reel 6A and a take-up reel 7A, between which a magnetic tape 8A is installed. The cassette 5B likewise has a supply reel 6B and a take-up reel 7B, between which a magnetic tape 8B is extended.

In the case 1 there are disposed opposite the cassette loading unit 2A, as shown in FIG. 2, a rotary head assembly 9A, an erasing magnetic head 10A for erasing signals on the mangetic tape 8A over the entire width thereof, a control signal recording and reproducing magnetic head 12A for recording a control signal on the lower marginal portion of the magnetic tape 8A while forming a control signal track and reproducing therefrom the recorded control signal, a control signal erasing magnetic head 11A for erasing the control signal track, a sound signal recording and reproducing magnetic head 14A for recording a sound signal on the upper marginal portion of the magnetic tape 8A while forming a sound signal track and reproducing therefrom the recorded sound signal, and a sound signal erasing magnetic head 13A for erasing the sound signal track. A magnetic tape threading mechanism 15A is provided for threading the magnetic tape 8A across the rotary magnetic head assembly 9A, the erasing magnetic head 10A, the control signal recording and reproducing magnetic head 12A, the control signal track erasing magnetic head 11A, the sound signal recording and reproducing magnetic head 14A and the sound signal track erasing magnetic head 13A. Further, there are provided a capstan 16A for driving the magnetic tape 8A and a pinch roller 17A for contract with the capstan 16A gripping therebetween the magnetic tape 8A. The rotary magnetic head assembly 9A, the erasing magnetic head 10A, the control signal recording and reproducing head 12A, the control signal track erasing magnetic head 11A, the sound signal recording and reproducing magnetic head 14A, the sound signal track erasing magnetic head 13A, the magnetic tape threading mechanism 15A, the capstan 16A and the pinch roller 17A are similar in construction with those employed in the known VHS system VTR's. Hence no detailed description will be given of them. The rotary mangetic head assembly 9A has a rotary head disc 20A on which magnetic heads 18A and 19A (not shown in FIG. 2) are disposed on the outer peripheral portion thereof at substantially diametrically opposite positions, and a pair of magnetic tape guide drums 21A and 22A disposed coaxially with the rotary head disc 20A. The magnetic tape threading mechanism 15A has a plurality of guide pins 23A. In FIG. 2, reference numeral 24A indicates impedance roller. The magnetic tape 8A is drawn out from the cassette 5A on the cassette loading unit 2A by means of movable guide pins of a plurality of guide pins 23A and the magnetic tape 8A is drawn across the erasing magnetic head 10A, the rotary magnetic head assembly 9A, the control signal recording and reproducing magnetic head 12A, the control signal track erasing magnetic head 11A, the sound signal recording and reproducing magnetic head 14A and the sound signal track erasing magnetic head 13A.

As in the case of the VHS system VTR, after such threading of the magnetic tape 8A, the pinch roller 17A is brought into contact with the capstan 16A and the capstan 16A is driven (its drive means being not shown) to drive the magnetic tape 8A. The rotary head disc 20A of the rotary magnetic head assembly 9A is driven as described later. The modes of operation for driving and stopping the magnetic tape 8A and the rotary head disc 20A, fast forwarding and rewinding the magnetic tape 8A and for recording and reproducing are changed over by a mode switch 30A disposed on the front portion of the case 1, as is the case with the VHS system VTR.

In the case 1 there are further disposed opposite the cassette loading unit 2B, as shown in FIG. 3, a rotary head assembly 9B, an erasing magnetic head 10B for erasing signals on the magnetic tape 8B over the entire width thereof, a control signal recording and reproducing magnetic head 12B, for recording a control signal on the lower marginal portion of the magnetic tape 8B while forming a control signal track and reproducing therefrom the recorded control signal, a control signal erasing magnetic head 11B for erasing the control signal track, a sound signal recording and reproducing magnetic head 14B for recording a sound signal on the upper marginal portion of the magnetic tape 8B while forming a sound signal track and reproducing therefrom the recorded sound signal, and a sound signal erasing magnetic head 13B for erasing the sound signal track. A magnetic tape threading mechanism 15B is provided for threading the magnetic tape 8B across the rotary magnetic head assembly 9B, the erasing magnetic head 10B, the control signal recording and reproducing magnetic head 12B, the control signal track erasing magnetic head 11B, the sound signal recording and reproducing magnetic head 14B and the sound signal track erasing magnetic head 13B. Further, there are provided a capstan 16B for driving the magnetic tape 8B and a pinch roller 17B for contact with the capstan 16B gripping therebetween the magnetic tape 8B. The rotary magnetic head assembly 9B, the erasing magnetic head 10B, the control signal recording and reproducing head 12B, the control signal track erasing magnetic head 11B, the sound signal recording and reproducing magnetic head 14B, the sound signal track erasing magnetic head 13B, the magnetic tape threading mechanism 15B, the capstan 16B and the pinch roller 17B are similar in construction with those employed in the known β system VTR's. Hence no detailed description will be given of them. The rotary magnetic assembly 9B has a rotary head disc 20B on which magnetic heads 18B and 19B (not shown in FIG. 3) are disposed on the outer peripheral portion thereof at substantially diametrically opposite positions, and a pair of magnetic tape guide drums 21B and 22B disposed coaxially with the rotary head disc 20B. The magnetic tape threading mechanism 15B has a plurality of guide pins 23B, a rotary ring 25B and a rotary arm 26B respectively having planted thereon some of the guide pins 23B and a rotary arm 27B having planted thereon the remaining guide pin 23B and pivoted to the rotary ring 25B. The magnetic tape 8B is drawn out from the cassette 5B on the cassette loading unit 2B by that one of the guide pins 23B planted on the rotary arm 27B and the magnetic tape 8B is drawn across the erasing magnetic head 10B, the rotary magnetic head assembly 9B, the control signal recording and reproducing magnetic head 12B, the control signal track erasing magnetic head 11B, the sound signal recording and reproducing magnetic head 14B and the sound signal track erasing magnetic head 13B.

As in the case of the β system VTR, after such threading of the magnetic tape 8B, the pinch roller 17B is brought into contact with the capstan 16B and the capstan 16B is driven (its drive means being not shown) to drive the magnetic tape 8B. The rotary head disc 20B of the rotary magnetic head assembly 9B is driven as described later. The modes of operation for driving and stopping the magnetic tape 8B and the rotary head disc 20B, fast forwarding and rewinding the magnetic tape 8B and for recording and reproducing are changed over by a mode switch 30B disposed on the front portion of the case 1, as is the case with the β system VTR.

It has been described previously that after the cassette 5A is loaded on the cassette loading unit 2A, the magnetic tape 8A is threaded across the rotary magnetic head assembly 9A and so forth and driven in the same manner as in the VHS system VTR, and that after loading of the cassette 5B on the cassette loading unit 2B, the magnetic tape 8B is threaded across the rotary magnetic head assembly 9B and driven in the same manner as in the β system VTR. While the magnetic tape 8A is driven to run across the rotary magnetic head assembly 9A, video signals and sound signals are recorded on or reproduced from the magnetic tape 8A in the same way as in the VHS system VTR. In this case, the video signals are recorded across the magnetic tape 8A except its upper and lower marginal portions while forming video signal tracks oblique to the lengthwise direction of the tape 8A, or the video signals are reproduced from such oblique video signal tracks. At the same time, the sound signals are also recorded on the sound signal tracks, or reproduced therefrom. This will be described with reference to FIG. 4. During recording, video signals from a video signal input terminal 31A are supplied to a video signal processsing circuit 32A for recording and the output from the processing circuit 32A is applied via a recording contact R of a recording/reproducing changeover switch 33A and a slip-ring mechanism 34A to each of the magnetic heads 18A and 19A mounted on the rotary head disc 20A of the rotary magnetic head assembly 9A. During reproducing, the outputs from the magnetic heads 18A and 19A are provided via the slip-ring mechanism 34A and a reproducing contact P of the changeover switch 33A to a video signal processing circuit 35A for reproducing, the output from which is derived at a video signal output terminal 36A. Further, during recording sound signals from a sound signal input terminal 37A are supplied via a sound signal amplifier 38A for recording and a recording contact R of a recording/reproducing changeover switch 39A to the sound signal magnetic head 14A. During reproducing, the output from the magnetic head 14A is applied via a reproducing contact P of the changeover switch 39A and a sound signal amplifier 40A for reproducing to a sound signal output terminal 41A. The rotary head disc 20A of the rotary magnetic head assembly 9A is adapted to be driven by a drive unit 42A including a motor and the drive unit 42A is, in turn, controlled by a drive control circuit 43A. During recording, the output from a vertical synchronizing signal separator 44A, which is supplied with the video signal from the video signal input terminal 31A, is supplied as a control signal to the drive control circuit 43A via a recording contact R of a changeover switch 45A. At the same time, the drive control circuit 43A is supplied with a rotating phase detected output from a rotating phase detector means 46A via an amplifier 47A. The drive control circuit 43A controls the drive unit 42A so that the output resulting from a phase comparison between the control signal and the rotating phase detected output may be zero or constant. Accordingly, the rotary head disc 20A is driven by a drive control servo system for recording including the drive control circuit 43A receiving, as its input, the control signal from the synchronizing signal separator 44A, the drive unit 42A and the rotating phase detecting means 46A. In this case, the control signal available from the synchronizing signal separator 44A or the rotating phase detected signal (which is shown to be the rotating phase detected signal available from the rotating phase detecting means 46A) is supplied as a control signal to the control signal magnetic head 12A via a recording amplifier 48A and a recording contact R of a changeover switch 49A. Consequently, during recording the control signal is recorded on the control signal track of the magnetic tape 8A. During reproducing the control signal reproduced by the control signal magnetic head 12A is applied to the drive control circuit 43A via a reproducing contact P of the changeover switch 49A, a reproducing amplifier 50A and reproducing contact P of the switch 45A and, at the same time, the rotating phase detected signal from the rotating phase detecting means 46A is also applied to the drive control circuit 43A via the amplifier 47A. The drive control circuit 43A controls the drive unit 42A so that the output resulting from comparison between the control signal and the rotating phase detected output in this case may bezero or constant. Accordingly, the rotary head disc 20A is driven by a drive control servo system for reproducing which includes the drive control circuit 43A receiving, as its input, the control signal available from the control magnetic head 12A, the drive unit 42A and rotating phase detecting means 46A.

Figure 4:
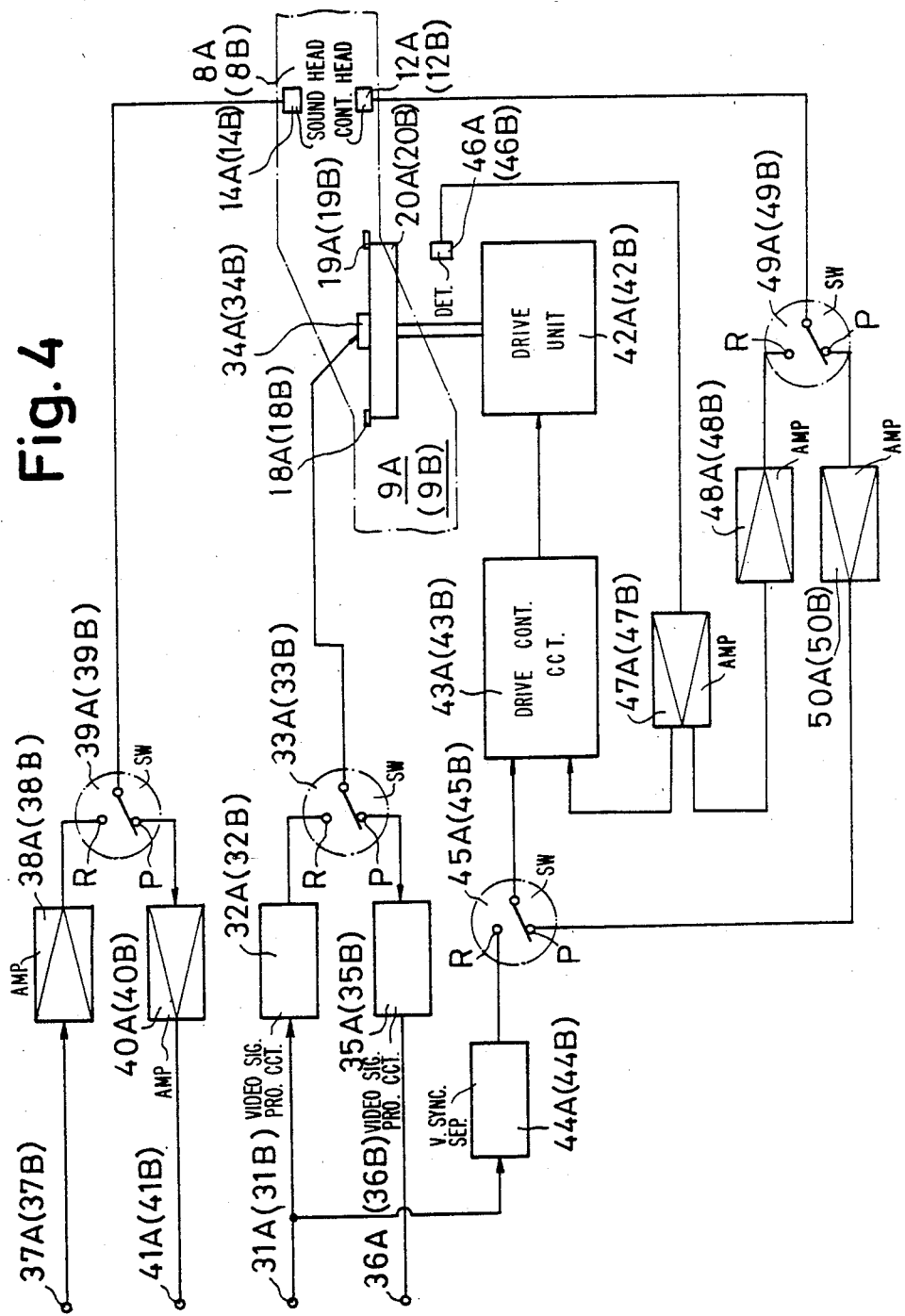
FIGS. 4 to 8 are electrical connection diagrams of the principal parts of first to fifth embodiments of the VTR of the present invention.

In the foregoing, the VTR of this embodiment has been described to be adapted so that video signals and sound signals are recorded on or reproduced from the magnetic tape 8A while the tape is travelling around the rotary head assembly 9A, as in the case of the VHS system VTR. Similarly, video signals and sound signals are recorded on or reproduced from the magnetic tape 8B while the tape is directed around the rotary magnetic head assembly 9B as in the case of the β system VTR. In this case, the video signals are recorded across magnetic tape 8B except its upper and lower marginal portions while forming video signal tracks oblique to the lengthwise direction of the tape, or the recorded signals are reproduced therefrom, and the sound signals are also recorded on sound signal tracks or reproduced. In connection with this, the parts corresponding to the abovesaid ones in FIG. 4 are identified by the same reference numerals suffixed with "B" instead of "A" and parenthesized.

The above is a description of the first embodiment of the present invention. This embodiment is capable of recording video signals on the tape of either of the VHS system and β system tape cassettes and reproducing therefrom the recorded signals, though not described in detail.

Next, a description will be given of a second embodiment of the present invention. This embodiment is similar in construction to the first embodiment described previously with respect to FIGS. 1, 2 and 3. This embodiment has such an arrangement that video signals and sound signals recorded on the magnetic tape 8A of the VHS system tape cassette 5A loaded on the VHS system tape cassette loading unit 2A in the case 1 are reproduced in the same way as in the VHS system VTR while the magnetic tape 8A is running around the rotary magnetic head assembly 9A similar to that employed in the VHS system VTR, but does not have the arrangement for recording the video signal and the sound signal on the magnetic tape 8A. Further, this embodiment has such an arrangement that video signals and sound signals recorded on the magnetic tape 8B of the β system tape cassette 5B loaded on the β system tape cassette loading unit 2B in the case 1 are reproduced in the same way as in the β system VTR while the magnetic tape 8B is running around the rotary magnetic head assembly 9B similar to the employed in the β system VTR, but does not have the arrangement for recording the video signal and the sound signal on the magnetic tape 8B. Accordingly, the VTR of this embodiment is one that is capable only of individually reproducing the video signals recorded on the magnetic tapes 8A and 8B. A description will be given, with reference to FIG. 5, of the individual reproducting of the video signals recorded on the magnetic tapes 8A and 8B in this embodiment. In the case of reproducing the video signal recorded on the magnetic tape 8A, the outputs from the rotary magnetic heads 18A and 19A of the rotary magnetic head assembly 9A are provided via the slip-ring mechanism 34A to a video signal processing circuit 35A for reproducing and the output from the circuit 35A is applied to a video signal output terminal 36 via a VHS system tape cassette contact a of a VHS system/β system tape cassette changeover switch 60 and an amplifier 61. The output from the sound signal magnetic head 14A is provided to a sound signal output terminal 41 via a VHS system tape cassette contact a of a changeover switch 62 similar to the above-said one 60 and via an amplifier 40. The rotary head disc 20A of the rotary magnetic head assembly 9A is driven by the drive unit 42A, which is, in turn, controlled by the drive control circuit 43 similar to those 43A and 43B mentioned in FIG. 4 via a contact a of a changeover switch 63 similar to those 60 and 62 mentioned above. The drive control circuit 43 is supplied with the control signal from the control magnetic head 12A via a contact a of a changeover switch 64 similar to the above-said one 60 and a reproducing amplifier 50 similar to those 50A and 50B in FIG. 4. At the same time, the drive control circuit 43 is supplied with the rotating phase detected signal from the rotating phase detecting means 46A via a contact a of a changeover switch 65 similar to the abovesaid one 60 and an amplifier 47 similar to those 47A and 47B in FIG. 4. The drive control circuit 43 controls the drive unit 42A so that the output resulting from phase comparison of the control signal and the rotating phase detected output may be zero or assume a constant value. Accordingly, the rotary head disc 20A is driven by the drive control servo system for reproducing as in the case of the first embodiment.

Figure 5:
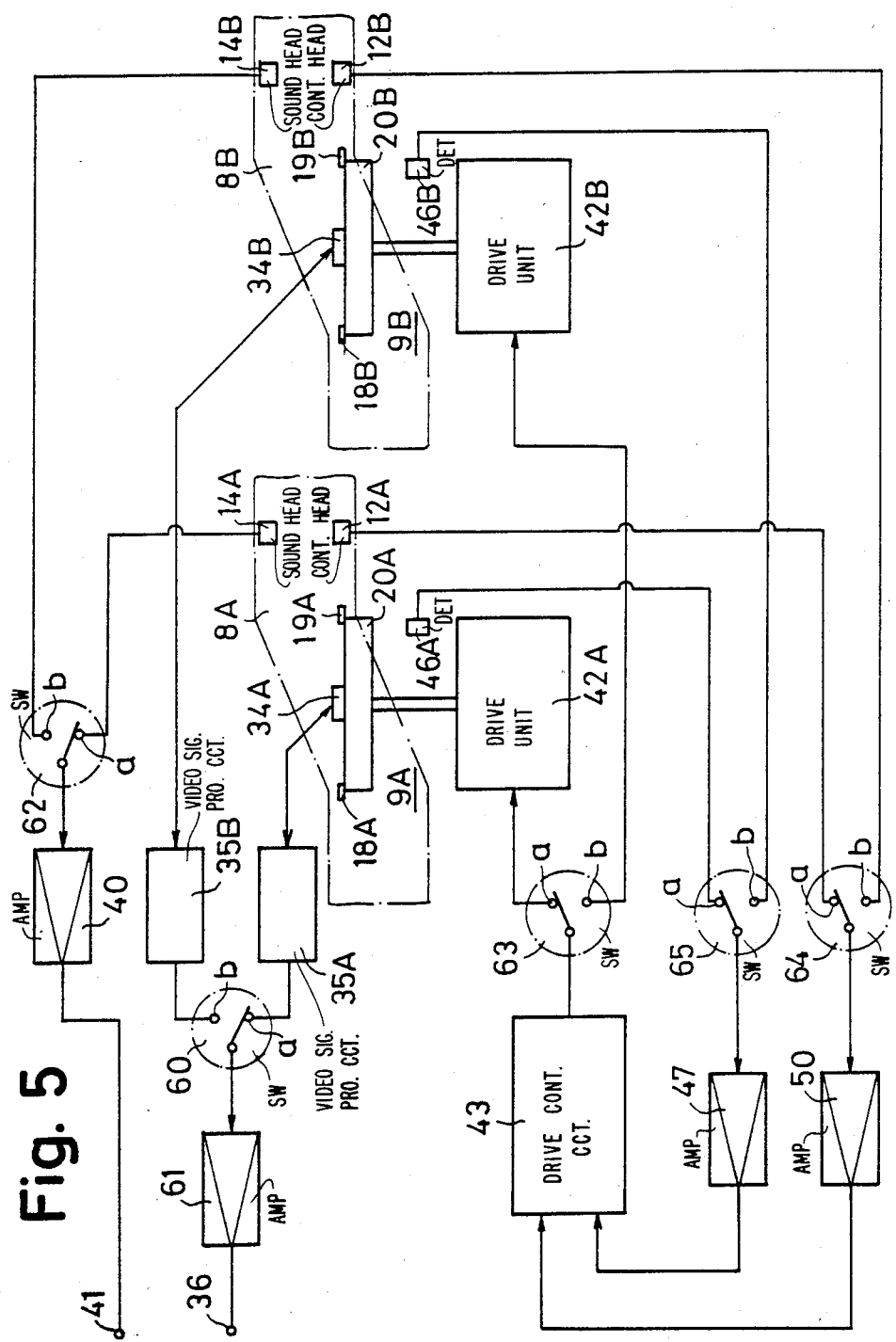

The method of reproducing the video signal and the sound signal recorded on the magnetic tape 8B is evident from FIG. 5, and hence no detailed description will be given. In this case, by connecting each of the changeover switches 60, 62, 63, 64 and 65 to a β system tape cassette contact b, the video signal and the sound signal are reproduced from the magnetic tape 8B in the same manner as in the case of reproducing the video signal and the sound signal from the magnetic tape 8A.

The above is a description of the second embodiment. This embodiment permits reproducing of video signals recorded on the tape of either of the VHS system and β system tape cassettes 5A and 5B though not described in detail. In this case, the drive control circuit 43 and amplifiers 47 and 50 are common to the drive unit 42A and 42B of the rotary magnetic head assemblies 9A and 9B, and the both drive units 42A and 42B are placed under the control of a common drive control servo system for reproducing. Therefore, this embodiment is simple-structured as a whole but permits reproducing video signals recorded on the tape of either of the VHS system and β system tape cassettes.

Next, a description will be given of a third embodiment of the VTR of the present invention.

As is the case with the second embodiment described above, the third embodiment has the same arrangement as described previously in respect of FIGS. 1, 2 and 3. This embodiment is designed to individually reproduce video signals recorded on the magnetic tapes 8A and 8B and to individually record video signals on the magnetic tapes 8A and 8B as in the case of the second embodiment. Accordingly, the VTR of this embodiment is one that is capable of individually recording video signals on the magnetic tapes 8A and 8B and individually reproducing therefrom the recorded signals.

Figure 6:
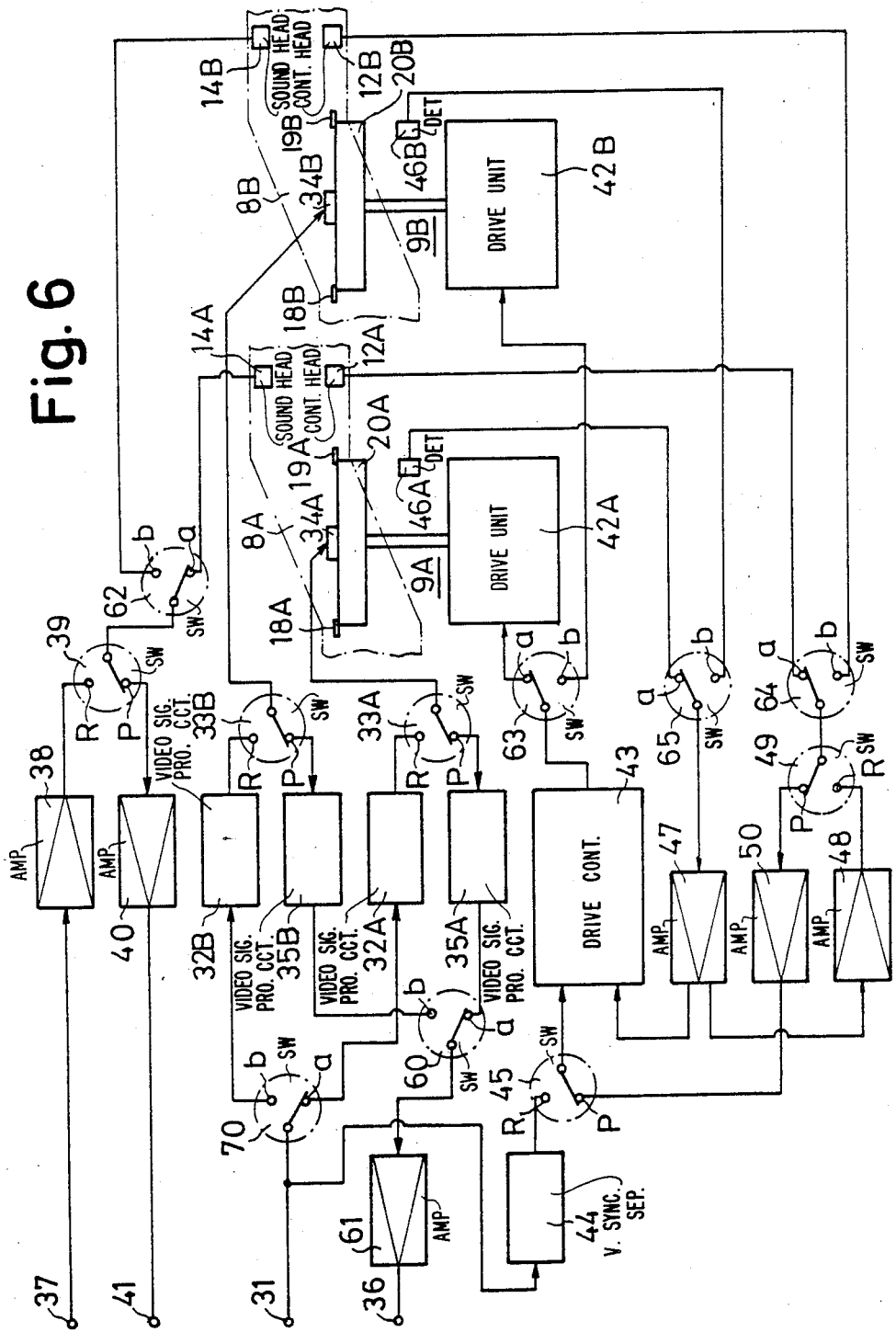

Referring now to FIG. 6, the arrangement for individual recording and reproducing of video signals will be described. In FIG. 6, the parts corresponding to those in FIGS. 4 and 5 are identified by the same reference numerals and no detailed description will be repeated. The arrangement of FIG. 6 is identical with that depicted in FIG. 5 except the following points. That is, this arrangement includes the video signal input terminal 31, the video signal processing circuits 32A and 32B for recording, the sound signal input terminal 37, the sound signal amplifier 38 for recording, the vertical synchronizing signal separator 44 and the recording amplifier 48 which are identical to those described previously with respect to FIG. 4. A changeover switch 70 similar to the aforementioned one 60 is provided between the video signal output terminal 31 and the video signal processing circuits 32A and 32B. In addition, the recording/reproducing changeover switch 33A is provided between the processing circuits 32A and 35A and the slip-ring mechanism 34A; the recording/reproducing changeover switch 33B is provided between the processing circuits 32B and 35B and the slip-ring mechanism 34B; a recording/reproducing changeover switch 39 is provided between the amplifiers 38 and 40 and the changeover switch 62; a recording/reproducing changeover switch 45 is provided between the synchronizing signal separator 44, the amplifier 50 and the drive control circuit 43; and a recording/reproducing changeover switch 49 is provided between the amplifiers 48 and 50 and the changeover switch 64.

The above is description of the third embodiment of the present invention. This embodiment is able to individually record video signals on the magnetic tapes 8A and 8B and to individually reproduce therefrom the recorded signals. In this case, the drive units 42A and 42B are arranged to be controlled by a common drive control servo system for recording use as in the case of the second embodiment and to be controlled by a common drive control servo system for reproducing use making the drive control circuit 43 and the amplifiers 47 and 48 common to them. Moreover, the recording amplifier 38 and the reproducing amplifier 40 are employed which are common to the rotary magnetic head assemblies 9A and 9B. Therefore, this embodiment is simple in construction but capable of individually recording video signals on the magnetic tapes 8A and 8B and individually reproducing therefrom the recorded signals.

Next, a fourth embodiment of the present invention will be described.

As is the case with the second and third embodiments described above, this embodiment has the same arrangement as that described previously with regard to FIGS. 1 to 3. But this embodiment is arranged so that video signals and sound signals recorded on either one of the magnetic tapes 8A and 8B may be recorded on the other tape and reproduced therefrom.

Figure 7:
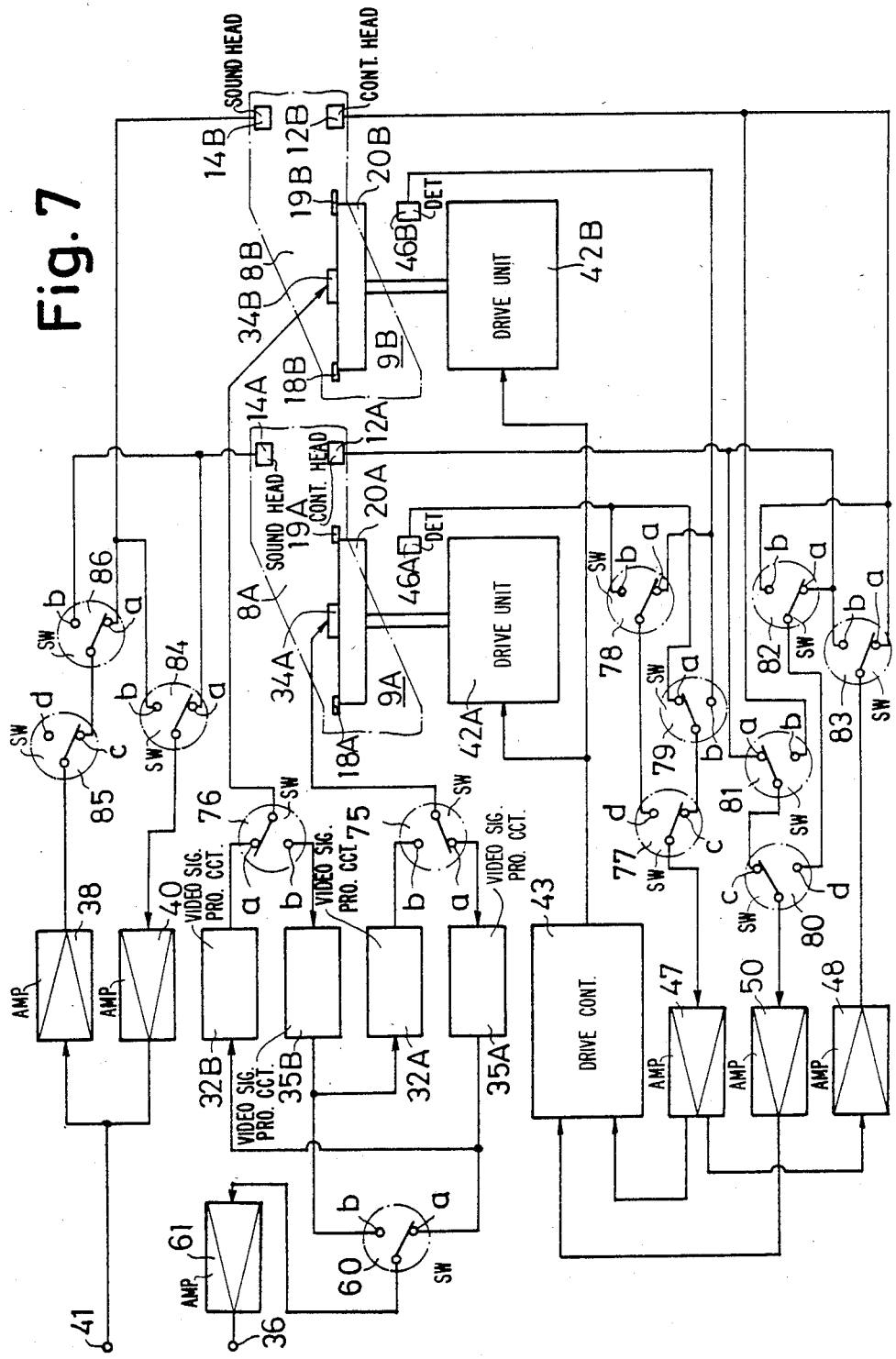

Turning now to FIG. 7, the abovesaid function and the arrangement therefor will be described. In FIG. 7, the parts corresponding to those in FIG. 6 are marked with the same reference numerals and no detailed description be repeated. The arrangement of FIG. 7 is identical with that of FIG. 6 except the following points. The video signal input terminal 31, the sound signal input terminal 37, the synchronizing signal separator 44 and the changeover switches 33A, 33B, 39, 45, 49, 62, 63, 64, 65 and 70 are omitted. However, the arrangement of this embodiment is designed so that the outputs from the video signal processing circuits 35A and 35B for reproducing may be supplied to the video signal processing circuits 32B and 32A for recording, respectively. Further, a changeover switch 75 similar to the aforementioned one 60 is provided between the video signal processing circuits 32A and 35A and the slip-ring mechanism 34A; a changeover switch 76 similar to the aforesaid one 60 is provided between the video signal processing circuits 32B and 35B and the slip-ring mechanism 34B; a changeover switch 77 having contacts c and d is provided on the input side of the amplifier 47; a changeover switch 78 similar to the aforesaid one 60 is provided between the contact d of the changeover switch 77 and the rotating phase detecting means 46A and 46B; a changeover switch 79 similar to that 60 is provided between the contact c of the changeover switch 77 and the rotating phase detecting means 46A and 46B; a changeover switch 80 similar to that 77 is provided on the input side of the amplifier 50; a changeover switch 81 similar to that 60 is provided a contact c of the changeover switch 80 and the control signal magnetic heads 12A and 12B; a changeover switch 82 similar to that 60 is provided between a contact d of the changeover switch 80 and the control signal magnetic heads 12A and 12B; and a changeover switch 83 similar to that 60 is provided between the output side of the amplifier 48 and magnetic heads 12A and 12B. Moreover, the output of the audio amplifier 40 is connected to the sound signal output terminal 41 and the audio amplifier 38. In addition, a changeover switch 84 similar to that 60 is provided between the input side of the amplifier 40 and the sound signal magnetic heads 14A and 14B; a changeover switch 85 similar to that 77 is provided on the output side of the amplifier 38; and a changeover switch 86 similar to that 60 is provided between a contact c of the changeover switch 85 and the sound signal magnetic heads 14A and 14B.

The above is description of the fourth embodiment of the present invention. According to this embodiment, by connecting the changeover switches 77, 80 and 85 to the side of their contacts c and by connecting the changeover switches 60, 75, 76, 78, 79, 81, 82, 83, 84 and 86 to the side of their contacts a, the video signals and the sound signals recorded on the magnetic tape 8A of the VHS system tape cassette 5A can be recorded on the magnetic tape 8B of the $\beta$ system tape cassette 5B. In this case, the drive control servo system operates on the rotating phase detected signal concerning the rotary magnetic head assembly 9A and the reproduced output of the control signal recorded on the magnetic tape 8A. In this case, the control signal is recorded on the magnetic tape 8B. By connecting the changeover switches 77, 80 and 85 to the side of their contacts c and by connecting the changeover switches 60, 75, 76, 78, 79, 81, 82, 83, 84 and 86 to the side of their contacts b, the video signal and the sound signal recorded on the magnetic tape 8B can be recorded on the magnetic tape 8A. In this case, the drive control servo system operates on the rotating phase detected signal concerning the rotary magnetic head assembly 9B and the reproduced output of the control signal recorded on the magnetic tape 8B. In this case, the control signal is recorded on the magnetic tape 8A. Further, by connecting the changeover switches 77, 80 and 85 to the side of their contacts d and by connecting the changeover switches 60, 75, 76, 78, 79, 81, 82, 83, 84 and 86 to the side of their contacts a, the video signal and the sound signal recorded on the magnetic the tape 8A can be reproduced. In this case, the drive control servo system operates on the rotating phase detected signal concerning the rotary magnetic head assembly 8B and the reproduced output of the control signal recorded on the magnetic tape 8A. By connecting the changeover switches 77, 80 and 85 to the side of their contacts d and by connecting the changeover switches 60, 75, 76, 78, 79 81, 82, 83, 84 and 86 to the side of their contact b, the video signal recorded on the magnetic tape 8B as described above can be reproduced. In this case, the drive control servo system operates on the rotating phase detected signal concerning the rotary magnetic head assembly 8A and the reproduced output of the control signal recorded on the magnetic 8B.

According to the fourth embodiment of the present invention, the video signal recorded on the magnetic tape 8A can be recorded on the magnetic tape 8B and reproduced from the latter. And the video signal recorded on the magnetic tape 8B can be recorded on the magnetic tape 8A and reproduced from the latter. In this case, it must be noted here that the drive units 42A and 42B are driven by a common drive control servo system.

Next, a fifth embodiment of the present invention will be described.

As is the case with each of the afore-described second, third and fourth embodiments, this embodiment has the same construction as described previously in respect of FIGS. 1 to 3. But this embodiment is designed so that the video signal recorded on either one of the magnetic tapes 8A and 8B can be recorded on or from the other tape as in the fourth embodiment. Further, this embodiment is arranged so that external video signals can be recorded individually on the magnetic tapes 8A and 8B.

The abovesaid recording and reproducing functions of this embodiment and the arrangement therefor will hereinbelow be described with reference to FIG. 8.

Figure 8:
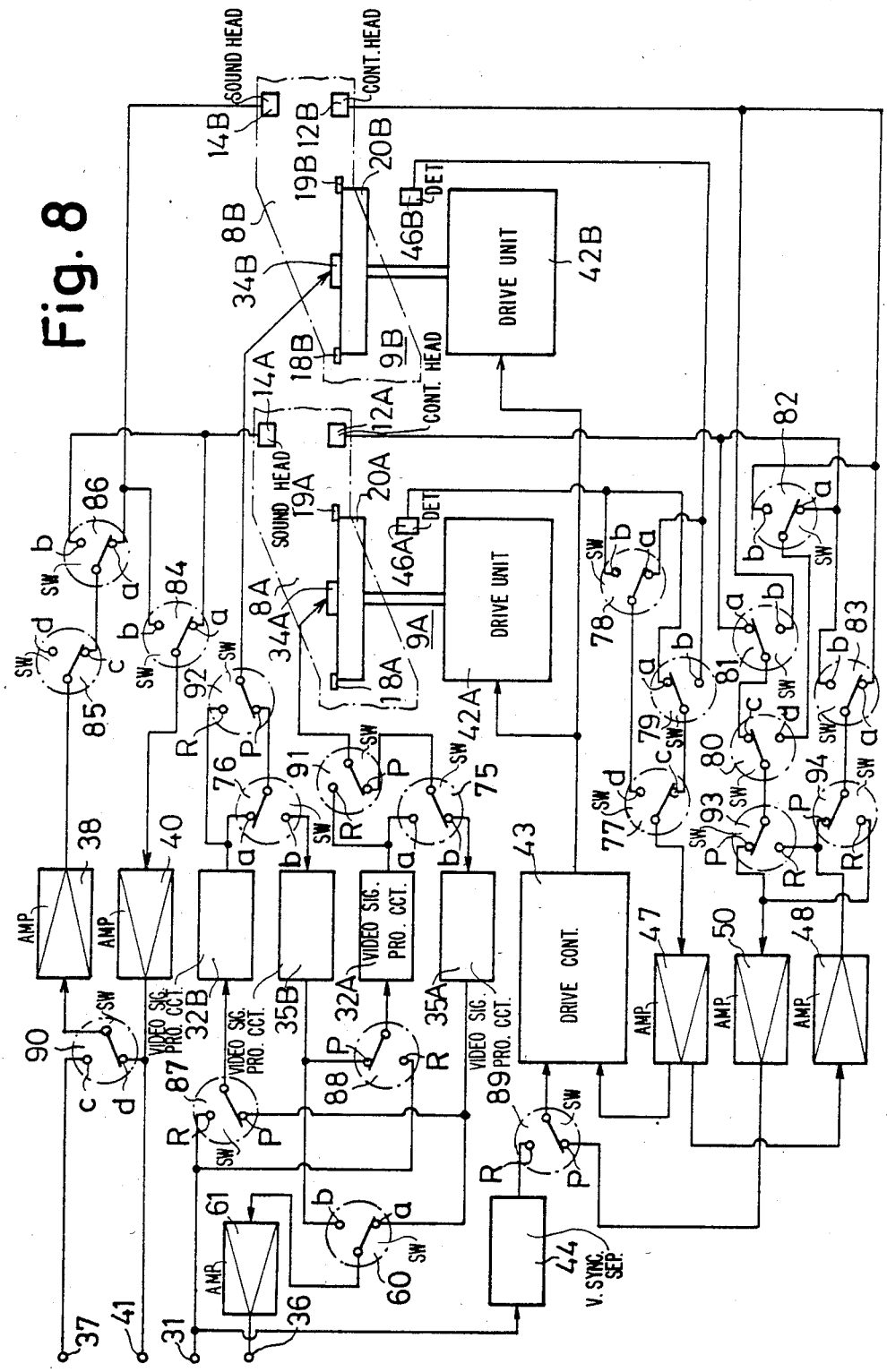

In FIG. 8, the parts corresponding to those in FIGS. 6 and 7 are identified by the same reference numerals and no detailed description will be repeated. The arrangement of this embodiment is identical with that of FIG. 7 except the following points. Namely, this embodiment has the video signal input terminal 31, the sound signal input terminal 37 and the synchronizing signal separator 44. Moreover, a changeover switch 87 having a recording contact R and a reproducing contact P is provided between the video signal input terminal 31, the processing circuit 35A and the processing circuit 32B; a changeover switch 88 similar to that 87 is provided between the video signal input terminnal 31, the processing circuit 35B and the processing circuit 32A; a changeover switch 89 similar to that 87 is provided between the synchronizing signal separator 44, the amplifier 50 and drive control circuit 43; a changeover switch 90 similar to that 87 is provided, between the sound signal input terminal 37, the amplifiers 40 and 38; a changeover switch 91 similar to that 87 is provided between a movable contact of the changeover switch 75, the processing circuit 32A and the slip-ring mechanism 34A; a changeover switch 92 similar to that 87 is provided between a movable contact of the changeover switch 76, the processing circuit 32B and the slip-ring mechanism 34B; a changeover switch 93 similar to that 87 is provided between the input side of the amplifier 50, the output side of the amplifier 48 and a movable contact of the changeover switch 80; and a changeover switch 94 similar to that 87 is provided between the input side of the amplifier 50, the output side of the amplifier 48 and a movable contact of the changeover switch 83.

The above is a description of the fifth embodiment of the present invention. Though not described in detail, this embodiment permits individual recording of external video signals on the magnetic tapes 8A and 8B in addition to the same recording and reproducing as in the fourth embodiment.

Figure 9:
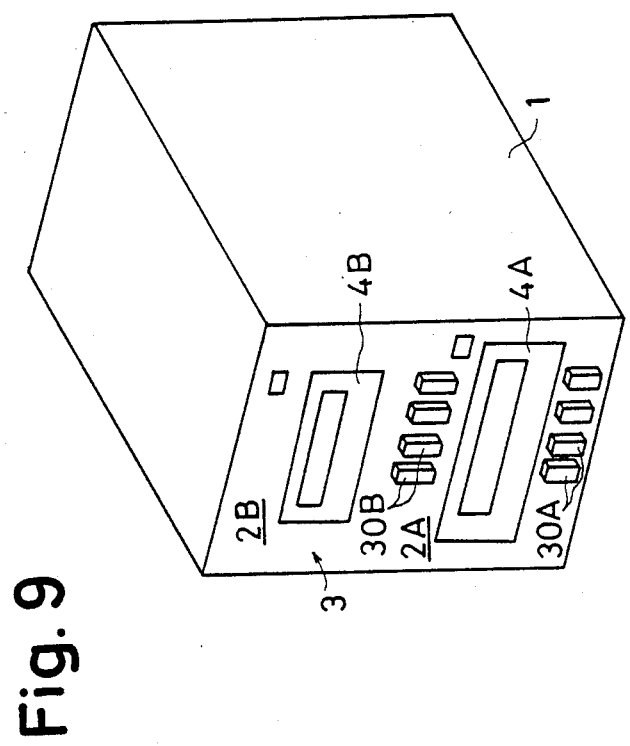
FIG. 9 is a perspective view schematically showing another embodiment of the VTR of the present invention.

The foregoing description has been given in connection with the case where the cassette loading units 2A and 2B are disposed in the case of side by side in the lateral direction but it is also possible to adopt such an arrangement as shown in FIG. 9 in which the cassette loading units 2A and 2B are disposed side by side to stand in the vertical direction so that tape cassettes may be loaded in the case 1 from the front thereof. In FIG. 9, the parts corresponding to those in FIG. 1 are marked with the same reference numerals though not described in detail.

While the foregoing has described a few embodiments of the present invention in connection with the case of employing the VHS system and β system tape cassettes, many modifications and variations of the present invention may be effected without being limited specifically thereto. Moreover, it will be apparent that the present invention is also applicable to the cases of any combinations of two tape cassettes of different constructions and sizes other than the combination of the VHS system and β system tape cassettes.

What is claimed is:

1. A video cassette tape recorder comprising:

a case;

a VHS-system tape cassette loading unit mounted on the case;

a beta-system cassette loading unit mounted on the case;

first drive means disposed within the case, for driving a VHS-system tape loaded on the VHS-system tape loading unit;

second drive means disposed within the case, for driving a beta-system tape loaded on the beta-system tape loading unit;

first video signal reproducing means disposed within the case for reproducing first video signals recorded on the VHS-system tape;

second video signal reproducing means disposed within the case, for reproducing second video signals recorded on the beta-system tape;

first sound signal reproducing means disposed within the case, for reproducing first sound signals recorded on the VHS-system tape;

second sound signal reproducing means disposed within the case, for reproducing second signals recorded on the beta-system tape;

first video signal recording means disposed within the case, for recording the first video signals available from the first video signal reproducing means on the beta-system tape;

second video signal recording means disposed within the case, for recording the second video signals available from the second video signal reproducing means on the VHS-system tape;

first sound signal recording means disposed within the case, for recording the first sound signals available from the first sound signal reproducing means on the beta-system tape, when the first video signals are recorded on the beta-system tape;

second sound signal recording means disposed within the case, for recording the second sound signal available from the second sound reproducing means on the VHS-system tape when the second video signals are recorded on the VHS-system tape;

first control signal reproducing means disposed within the case, for reproducing first control signals recorded on the VHS-system tape;

second control signal reproducing means disposed within the case, for reproducing second control signals recorded on the beta-system tape;

third control signal producing means disposed within the case, for producing third control signals in association with the first drive means;

fourth control signal producing means disposed within the case, for producing fourth control signals in association with the second drive means;

drive control means disposed within the case, for selectively producing first drive control signals by the first control signals available from the first control signal reproducing means and the third control signals available from the third control signal producing means and second drive control signals by the second control signals available from the second control signal reproducing means and the fourth control signals available from the fourth control signal producing means, and for selectively supplying the first and second drive control signals to the first and second drive means;

first control signal recording means disposed within the case, for recording on the beta-system tape the third control signals available from the third control signal producing means or the first control signals available from the first control signal reproducing means, when the first video signals are recorded on the beta-system tape; and second control signal recording means for recording on the VHS-system tape the fourth control signals available from the fourth control signal producing means or the second control signals available from the second control signal reproducing means, when the second video signals are recorded on the VHS-system tape;

wherein when the first video signals and the first sound signals recorded on the VHS-system tape are recorded on the beta-sytem tape;

(a) the first drive control signals from the drive control means are supplied to both of the first and second drive means;

(b) the first control signals from the first control signal reproducing means and the third control signals from the third control signal producing means are supplied to the drive control means;

(c) the first video signals from the first video signal reproducing means are supplied to the first video signal recording means;

(d) the first sound signals from the first sound signal reproducing means are supplied to the first sound signal recording means; and (e) the third control signals from the third control signal producing means are supplied to the first control signal recording means; and wherein when the second video signals and the second sound signals recorded on the beta-system tape are recorded on the VHS-system tape, (a) the second drive control signals from the drive control means are supplied to both of the first and second drive means;

(b) the second control signals from the second control signal reproducing means and the fourth control signals from the fourth control signal producing means are supplied to the drive control means;

(c) the second video signals from the second video reproducing means are supplied to the second video signal recording means;

(d) the second sound signals from the second sound signal reproducing means are supplied to the second sound signal recording means; and (e) the fourth control signals from the fourth control signal producing means are supplied to the second control signal recording means.

* * * * *